Jan. 31, 1967

C. G. STECKER 3,301,099

AUTOMATIC FORM TOOL HOLDER

Filed July 28, 1965

INVENTOR
CARL G. STECKER

BY Barthel & Bugbee
ATTORNEYS

Jan. 31, 1967  C. G. STECKER  3,301,099
AUTOMATIC FORM TOOL HOLDER
Filed July 28, 1965  2 Sheets-Sheet 2
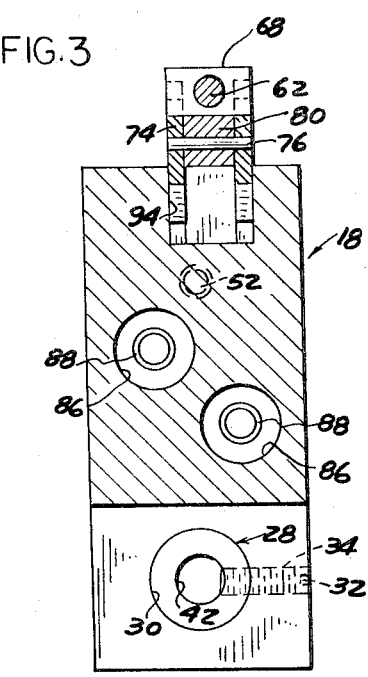
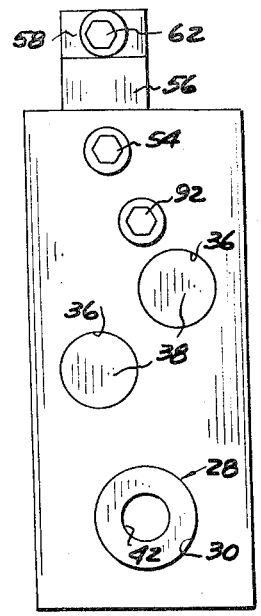
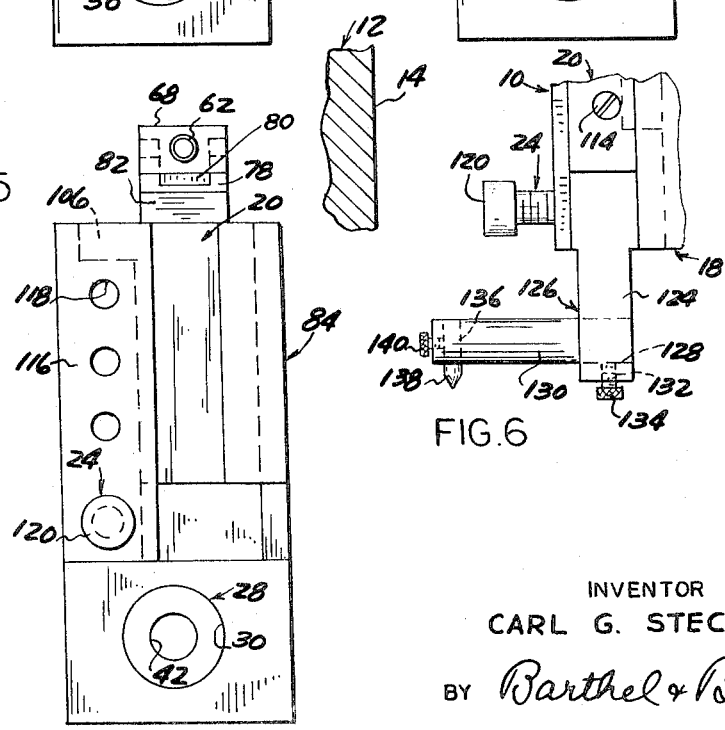
INVENTOR
CARL G. STECKER
BY Barthel & Bugbee
ATTORNEYS

United States Patent Office 3,301,099
Patented Jan. 31, 1967

3,301,099
AUTOMATIC FORM TOOL HOLDER
Carl G. Stecker, 47860 12 Mile Road,
Novi, Mich. 48050
Filed July 28, 1965, Ser. No. 475,472
6 Claims. (Cl. 77—1)

This invention relates to form tool holders and, in particular, to automatic form tool holders.

One object of this invention is to provide an automatic form tool holder which is capable of being mounted on a carriage of a so-called screw machine, either hand or automatic, and which automatically moves a main cutting tool that machines a rotating workpiece longitudinally to a predetermined position, then transversely to cut an annular recess of a desired depth, after which the retraction of the carriage automatically retracts the cutting tool first transversely, then longitudinally.

Another object is to provide an automatic form tool holder of the foregoing character wherein the tool holder also optionally carries an auxiliary cutting tool such as a drill, center drill or reamer mounted with its axis coincident with the axis of rotation of the workpiece so as to drill or ream longitudinally while the main cutting tool is cutting transversely.

Another object is to provide an automatic form tool holder of the foregoing character which is also adapted to automatically move a boring bar longitudinally to bore a rotating workpiece to a predetermined depth and then to move transversely to cut an annular recess at the bottom of the workpiece bore, whereupon retraction of the carriage carrying the tool holder first automatically retracts the boring bar transversely from the recess and then longitudinally from the bore, thus causing the boring tool to fully clear the recess and bore during the retraction stroke of the carriage.

Another object is to provide an automatic form tool holder of the foregoing character wherein the longitudinal motion of the carriage carrying the tool holder, by automatically effecting transverse motion of the cutting tool at a predetermined location in the longitudinal motion of the carriage, releases the cross slide of the machine for other uses by giving a transverse cross slide cutting effect as well as a longitudinal or axial cutting effect.

Another object is to provide an automatic form tool holder of the foregoing character, wherein means is provided for changing the transverse speed of the cutting tool relatively to the longitudinal speed of the carriage without changing this longitudinal speed.

Another object is to provide an automatic form tool holder of the foregoing character which is of such novel construction and arrangement as to be unusually compact as compared with prior form tool holders, in order to be accommodated in the restricted space available in a so-called screw machine.

Other objects and advantages of the invention will become apparent during the course of the following description of the accompanying drawings, wherein:

FIGURE 3 is a cross-section taken along the broken line 3—3 in FIGURE 1;

FIGURE 4 is a rear elevation of the machine shown in FIGURE 1;

FIGURE 5 is a front elevation thereof, with the cutting tool omitted; and

FIGURE 6 is a fragmentary side elevation, similar to FIGURE 1, but with a boring bar substituted for the tool bit of FIGURE 1.

Figure 1:
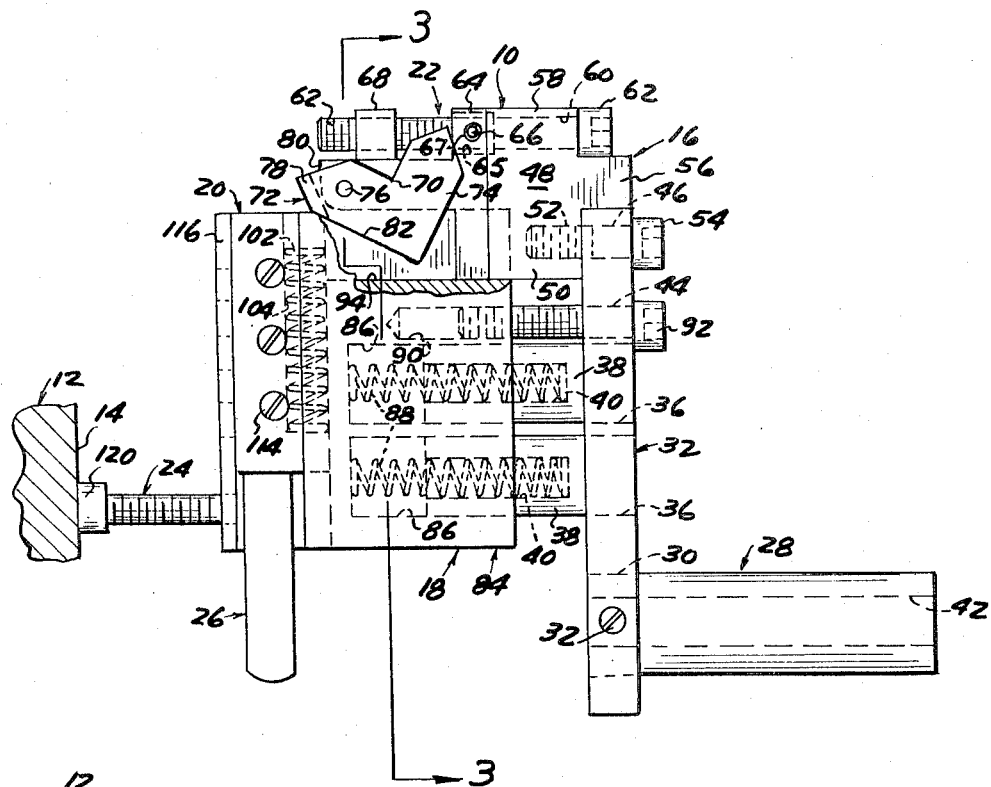
FIGURE 1 is a side elevation, partly in section, of an automatic form tool holder for screw machines, according to one form of the invention, with a cutting tool, particularly a boring bar, mounted therein, and with the machine omitted except for an abutment thereof.
Figure 2:
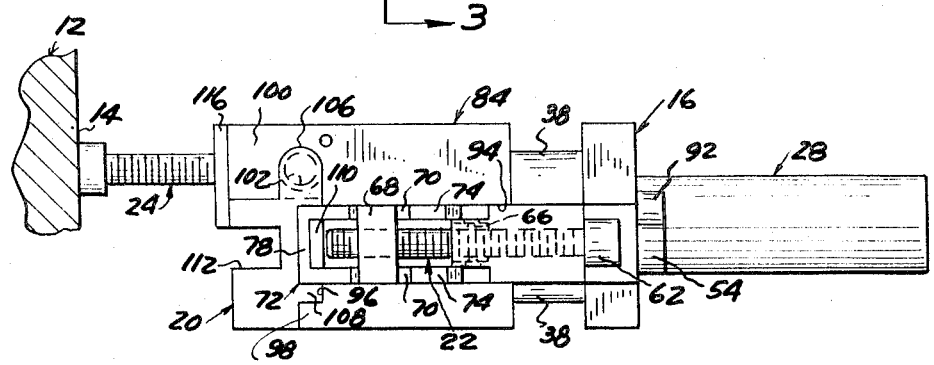
FIGURE 2 is a top plan view of the tool holder shown in FIGURE 1, with the cutting tool omitted.

Referring to the drawings in general, FIGURES 1 to 5 inclusive show an automatic form tool holder, generally designated 10, for mounting in a carriage of either a hand screw machine or an automatic screw machine 12, of which is shown only an abutment portion containing an abutment surface 14 perpendicular to the direction of motion of a longitudinal or end carriage of the screw machine 12. It will be understood that the term "screw machine" in modern times refers to a machine which is usually employed for forming workpieces other than screws, although its original name "screw machine" has survived.

The tool holder 10 consists generally of a mounting structure 16 which, as its name signifies, is mounted in a longitudinally-moving carriage of the screw machine, such as the end carriage thereof, a longitudinal slide structure 18, a transverse tool holder slide 20 (FIGURE 2) mounted for transverse motion in the longitudinal slide structure 18, a cross slide speed adjustment device 22, a tool holder stop screw 24, and a cutting tool 26, shown in FIGURE 1 as a cutting tool bit.

Referring to the drawings in detail, the mounting structure 16 includes a tubular mounting stem 28 pressfitted into an axial hole 30 in a back plate 32. These are drilled and threaded transversely to receive a set screw 34 which projects into a longitudinal bore 42 extending from end to end of the stem 28 and which optionally secures an auxiliary cutting tool (not shown) such as a drill, center drill or reamer, in the stem 28. The stem 28 thus also serves as a longitudinal auxiliary cutting tool holder movable unitarily with said mounting structure 16. The back plate 32 is also provided with a pair of axial holes 36 disposed with their axes parallel to one another. Secured in the axial holes 36 by having their outer ends slightly tapered and press-fitted into the straight holes 36 are two hollow guide bars 38 each having an inwardly-facing cupped spring socket 40 therein. The back plate 32 is also drilled slightly below its upper end above the holes 36 with a smooth-walled hole 44, and adjacent its upper end with an additional smoothwalled hole 46, the axes of the holes 44 and 46 being parallel to the axes of the holes 30 and 36.

The mounting structure 16 also includes a transverse feed speed adjustment supporting member 48 which in side elevation is of roughly cruciform shape. The member 48 includes a lower arm 50 drilled and threaded as at 52 to receive the threaded shank of a cap screw 54 inserted through the hole 46, and a horizontal rearward arm 56 which rests on top of the mounting plate 32 and is held securely thereagainst by the screw 54. The adjustment supporting member 48 also includes an upper arm 58 which is bored horizontally as at 60 to rotatably receive a transverse feed speed adjusting cap screw 62. Threaded onto the screw 62 within an enlargement 65 of the bore 60 is an internally-threaded stop collar 64. The collar 64 and screw 62 are drilled diametrically in alignment to receive a press-fitted pin 66 inserted through aligned enlarged access holes 67 in the arm 58 to prevent end motion during rotation thereof. Mounted for travel back and forth along the shank of the adjusting screw 62 is an internally-threaded nut 68 of rectangular form (FIGURE 3). The opposite ends of the nut 68 engage the opposite sides of aligned V-notches 70 in the upper edge of a parallel-walled roughly triangular rocking cam 72. The walls 74 are interconnected at their forward ends by a bridge portion 78 and are drilled to receive the opposite ends of a pivot pin 76.

The supporting member 48 is also provided with a forward horizontal arm 80 which is drilled transversely near its forward end to receive the intermediate portion of the pivot pin 76. The width of the forward arm 80 is less than the distance between the parallel side walls 74 of the cam 72 so that the cam 72 straddles the arm 80 (FIGURE 1). As a consequence, rotation of the adjusting screw 62 causes the nut 68 to move back and forth in its engagement with the notches 70, thereby causing the cam 74 to rock about its pivot pin 76. The cam 72 has a downwardly and rearwardly-inclined straight cam edge 82.

The longitudinal slide structure 18 includes a longitudinal slide block 84 (FIGURE 1) which is of the general shape of a vertically-elongated rectangular block but which is grooved and notched out at various locations as described below. The longitudinal slide block 84 is provided with a pair of horizonal cupped bores 86 which snugly but slidably receive the guide bars 38 and which are therefore coaxial therewith. Seated in each of the spring sockets 40 of the guide bars 38 and engaging the dead end of each bore 86 is a stiff helical compression spring 88 (FIGURE 3). The springs 88 tend to urge the longitudinal slide block 84 longitudinally and forwardly away from the back plate 32, yet are sufficiently stiff to be unyielding against the back pressure of longitudinal or axial cutting. In order to limit the length of the forward stroke of the longitudinal slide block 84, the latter is provided with a threaded horizontal bore 90 coaxial with the smooth bore 44 and threadably engaged by a stroke-limiting cap screw 92, the shank of which is threaded into the bore 90 and which passes loosely through the smooth bore 44. As a consequence, rotation of the screw 92 in one direction or the other shortens or lengthens the gap between the rearward surface of the slide block 84 and the forward surface of the back plate 32, this gap representin the stroke which the longitudinal slide block 84 and consequently the longitudinal slide structure 18 can make.

In its top portion, the longitudinal slide block 84 is provided with a horizontal longitudinal guide groove or slot 94 (FIGURES 1 and 3) which is substantially the width of the supporting member 48. The latter has parallel opposite sides so as to serve as an additional guide member for the longitudinal slide block 84 over and above the two guide bars 38. The cam 72 is also of substantially the same width as the support member 48 and horizontal longitudinal guide groove 94 so as to fit snugly but relatively slidably therein.

At its forward end, the longitudinal slide block 84 is provided with a transverse guide slot or groove 96 (FIGURE 2) of approximately rectangular cross-section in line with the cam 72, which with its associated adjusting mechanism is disposed with its axis slightly to the left of the axis of the mounting stem 28 (FIGURE 2) so that the front wall 98 of the groove 96 is much thinner than the back wall 100 thereof, and is also much shorter in a forward direction, so that the front of the transverse guide slot or groove 96 is much shallower than the back thereof. The thicker back wall 100 of the transverse guide groove 96 in the longitudinal slide block 84 is provided with an elongated transverse pocket or alcove 102 (FIGURES 1 and 2) which receives a compression coil spring 104, the lower end of which abuts the bottom of the pocket or alcove 102. The upper end of the spring 104 engages an arm 106 which projects laterally from the top of the transverse tool slide 20 so as to normally urge the latter in a transverse or radial direction.

The transverse slide 20 has a rearward portion 108 of approximately rectangular cross-section of approximately the same dimensions as the transverse guide groove 96 so as to snugly but slidably engage the transverse guide groove 96. The top surface 110 of the transverse slide 20 serves as a cam follower engaged by the inclined cam edges 82 of the double-walled rocking cam 72 during operation, as explained below. The transverse slide 20 is provided in its forward face with a transverse tool groove or slot 112 (FIGURE 2) and the front wall of the transverse slide 20 is drilled and threaded to receive set screws 114 (FIGURE 1) by which the tool bit 26 is held firmly in the groove 112. The transverse tool slide 20 is held in place by a retaining plate 116 and the back wall 100 of the slide block 84 is drilled and threaded to receive set screws 118 (FIGURE 5) by which the retaining plate 116 is held in position. The retaining plate 116 is drilled and the wall 100 drilled and threaded to receive the shank of the tool holder stop screw 24, the head of which has a flat surface 120 adapted to engage the flat abutment surface 14.

Normally, for radial or transverse cutting of the workpiece, the tool groove 112 contains the tool bit 26 (not shown). Optionally insertable in the tool groove 112, however, as shown in FIGURE 6, is the supporting arm 124 of a modified cutting tool 126 consisting of a boring tool. The arm 124 is bored axially at 128 to receive the rearward end portion of a boring bar 130 and is drilled and threaded transversely as at 132 to receive a locking set screw 134 therefor. The boring bar 130 adjacent its forward end is drilled or broached transversely as at 136 to receive a boring tool bit 138 and is drilled and threaded at its forward end to receive a locking set screw 140 by which the tool bit 138 is locked in position.

In the operation of the automatic form tool holder 10, let it be assumed that the mounting stem 28 is secured in a corresponding bore in a longitudinally-movable carriage, such as the end carriage of an automatic screw machine 12, and that a cutting tool, such as the tool bit 26, has been mounted in the tool slot 112. Let it also be assumed that the transverse feed adjustment screw 62 has been rotated to move the nut 68 to such a position that the inclined cam surfaces 82 of the double cam 72 are presented to the top surface 108 of the vertical slide 20 in such a manner as to impress a transverse stroke of predetermined length upon the vertical slide 20. Let it also be assumed that the stop screw 24 has been adjusted forward or rearward to the correct location where its front surface 120 will engage the abutment surface 14 of the automatic screw machine 12 during travel of the end carriage at the very instant and location that it is desired for transverse cutting to begin. Let it finally be assumed that the longitudinal stroke adjustment screw 92 has been adjusted by rotating it relatively to the threaded bore 90 within the slide block 84 to limit the longitudinal or axial stroke of the cutting tool 26 the desired amount.

These adjustments having been made, the operator starts the screw machine and, either in response to the cams of the automatic screw machine or the manually operated mechanism of a hand screw machine, whichever happens to be in use, the longitudinal or end carriage carrying the automatic form tool holder 10 moves the latter bodily toward the workpiece while the latter is being held in and rotated by a suitable rotary support, such as a means mounted on the live spindle of the machine. When the cutting tool 26 encounters the workpiece, it proceeds to cut a longitudinal portion of the workpiece so as to reduce that part of the workpiece to a predeterimned diameter. When, however, the stop surface 120 at the end of the stop screw 24 encounters the abutment surface 14, it causes the longitudinal slide structure 18 to halt while the mounting structure 16 continues to move forward, overcoming the opposing thrust of the compression springs 88. Meanwhile, the upper end 110 of the transverse slide 20 encounters the downwardly and rearwardly-inclined surfaces 82 of the double-walled cam 72 and moves radially inward as the cam 72 is pushed forward by the forward motion of the mounting structure 16. This action causes the cutting tool 26 to move downward transversely to the axis of rotation of the workpiece, thereby cutting therein a groove of predetermined depth, as regulated by the gap between the forward surface of the back plate 32 and the rearward surface of the slide block 84.

The machine is then reversed, either automatically by its cams or manually by the operator, whereupon the mounting structure 16 moves rearwardly to the right while the compression springs 88 continue to press the stop screw 24 of the longitudinal slide block 84 against the abutment surface 14 of the machine 12. The compression spring 106, which has been compressed during the downward stroke of the transverse slide 20, now pushes the transverse slide 20 radially outward relatively to the axis of rotation of the now-machined and grooved workpiece. The longitudinal slide block 84 and mounting structure 16 move apart in this manner until the head of the screw 92 engages the rearward side of the back plate 32, whereupon the longitudinal slide block 84 and the longitudinal slide structure 18 are caused to move bodily to the right upon their retraction stroke, thereby withdrawing the cutting tool 26 from the location of the workpiece.

The operation of the automatic form tool holder 10 of the present invention when equipped with the boring tool 126 is similar to that just described, except that a bore has already been drilled in the workpiece and this is bored out as the tool bit 138 moves into this bore. When, however, the tool bit 138 has moved longitudinally or axially into the workpiece bore a sufficient distance for the forward end 120 of the stop screw 24 to engage the abutment surface 14 of the machine 12, the forward motion of the cutting tool 138 halts and a radial or transverse feeding motion takes place in the manner previously described. This action produces a clearance groove or annular recess at the inner end of the bore. Upon reversal and retraction of the mounting structure 16, the action previously described in connection with FIGURES 1 to 5 inclusive occurs, whereby the radially outward motion of the transverse slide 20 first retracts the cutting tool 138 radially or transversely, after which, the longitudinal retraction of the longitudinal slide structure 18 in the manner described above retracts the boring bar 126 and the cutting tool 138 out of the bore which has just been machined.

The novel construction and arrangement of the automatic form tool holder 10 of the present invention, such as the arrangement of the cam 42 over the transverse slide 20 and the mounting of the springs 88 within the spring sockets 40 in the hollow bars 38, provides an unusually compact device capable of being accommodated in the limited space existing within the screw machine.

What I claim is:

1. An automatic form tool holder for a machine tool having a rotary work holder, a stop abutment and a carriage movable longitudinally toward and away from the work holder, said tool holder comprising
   a mounting structure attachable to said carriage for travel therewith and having a longitudinal guideway thereon extending forwardly therefrom toward the work holder,
   a longitudinal cutting tool holder mounted on said mounting structure for travel longitudinally therewith,
   a longitudinal slide structure guidedly engaging said longitudinal guideway for travel therealong forwardly toward and rearwardly away from the work holder,
      said longitudinal slide structure having a transverse guideway thereon extending transversely to the axis of rotation,
   a transverse slide guidedly engaging said transverse guideway for transverse travel therealong toward and away from the axis of rotation of the work holder,
   a stop element on said longitudinal slide structure engageable with the machine stop abutment for halting the travel of said longitudinal slide structure,
   a transverse cutting tool holder mounted on said transverse slide for travel therewith transversely to said longitudinal cutting tool holder,
   and means on said mounting structure responsive to the halting of said longitudinal slide structure and the continued longitudinal travel of said mounting structure for moving said transverse slide along said transverse guideway toward the axis of rotation of the work holder.

2. An automatic form tool holder, according to claim 1, wherein said longitudinal cutting tool holder includes a toolholding bore in said mounting structure and also includes tool-clamping means adjacent said tool-holding bore for securing an auxiliary longitudinal cutting tool in said bore.

3. An automatic form tool holder for a machine tool having a rotary work holder, a stop abutment and a carriage movable longitudinally toward and away from the work holder, said tool holder comprising
   a mounting structure attachable to said carriage for travel therewith and having a longitudinal guideway thereon extending forwardly therefrom toward the work holder,
   a longitudinal slide structure guidedly engaging said longitudinal guideway for travel therealong forwardly toward and rearwardly away from the work holder,
      said longitudinal slide structure having a transverse guideway thereon extending transversely to the axis of rotation,
   a transverse slide guidedly engaging said transverse guideway for transverse travel therealong toward and away from the axis of rotation of the work holder,
   a stop element on said longitudinal slide structure engageable with the machine stop abutment for halting the travel of said longitudinal slide structure,
   a transverse cutting tool holder mounted on said transverse slide for travel therewith,
   and means on said mounting structure responsive to the halting of said longitudinal slide structure and the continued longitudinal travel of said mounting structure for moving said transverse slide along said transverse guideway toward the axis of rotation of the work holder,
   said means including a cam on said mounting structure and a cam follower on said transverse slide,
      said cam being adjustably movable relatively to said transverse guideway.

4. An automatic form tool holder for a machine tool having a rotary work holder, a stop abutment and a carriage movable longitudinally toward and away from the work holder, said tool holder comprising
   a mounting structure attachable to said carriage for travel therewith and having a longitudinal guideway thereon extending forwardly therefrom toward the work holder,
   a longitudinal slide structure guidedly engaging said longitudinal guideway for travel therealong forwardly toward and rearwardly away from the work holder,
      said longitudinal slide structure having a transverse guideway thereon extending transversely to the axis of rotation,
   a transverse slide guidedly engaging said transverse guideway for transverse travel therealong toward and away from the axis of rotation of the work holder,
   a stop element on said longitudinal slide structure engageable with the machine stop abutment for halting the travel of said longitudinal slide structure, transverse cutting tool holder mounted on said transverse slide for travel therewith, and means on said mounting structure responsive to the halting of said longitudinal slide structure and the continued longitudinal travel of said mounting structure for moving said transverse slide along said transverse guideway toward the axis of rotation of the work holder, said means including a cam on said mounting structure and a cam follower on said transverse slide, said cam having a cam-follower-engaging portion inclined relatively to said transverse guideway, means being provided for altering the inclination of said cam-follower-engaging portion relatively to said transverse guideway.

5. An automatic form toolholder, according to claim 4, wherein said inclination-altering means includes a pivotal connection between said cam and said mounting structure and mechanism for adjustably tilting said cam on said pivotal connection.

6. An automatic form tool holder, according to claim 5, wherein said mechanism includes an adjusting screw rotatably mounted in said mounting structure and a nut threaded upon said adjusting screw in engagement with said cam at a location spaced away from said pivotal connection and movable to and fro along said screw to tilt said cam back and forth respectively in response to rotation of said adjusting screw in opposite directions.

References Cited by the Examiner
UNITED STATES PATENTS 2,337,530　12/1943　Loudon et al. _____ 82—17 X
3,208,312　9/1965　Heuser.

WILLIAM W. DYER, JR., *Primary Examiner.*

G. A. DOST, *Assistant Examiner.*